(12) United States Patent
Ko (10) Patent No.: US 12,253,305 B2
(45) Date of Patent: Mar. 18, 2025

(54) LNG REFORMING SYSTEM AND METHOD OF CONTROLLING THE SAME

(71) Applicants: Hyundai Motor Company, Seoul (KR); Kia Corporation, Seoul (KR)

(72) Inventor: Dong Seok Ko, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/480,908

(22) Filed: Sep. 21, 2021

(65) Prior Publication Data

US 2022/0325950 A1    Oct. 13, 2022

(30) Foreign Application Priority Data

Apr. 7, 2021 (KR) .................. 10-2021-0045183

(51) Int. Cl.
    *F25J 1/00*            (2006.01)

(52) U.S. Cl.
    CPC ........... *F25J 1/0095* (2013.01); *F25J 1/0022* (2013.01); *F25J 2210/62* (2013.01); *F25J 2215/04* (2013.01); *F25J 2245/02* (2013.01)

(58) Field of Classification Search
    CPC ...... F25J 1/0095; F25J 1/0022; F25J 2210/62; F25J 2215/04; F25J 2245/02; F25J 2205/90; F25J 2210/04; F25J 2245/90; F25J 1/0221; F25J 1/0244; F25J 1/0027; F25J 1/02; Y02P 30/00; C01B 3/34; C01B 2203/0205; C01B 2203/042; C01B 2203/0475; C01B 2203/123
See application file for complete search history.

(56) References Cited

U.S. PATENT DOCUMENTS 3,106,071 A * 10/1963 Green ................. F17C 7/02
                                               141/290
3,962,881 A * 6/1976 Muska ................. F25J 1/0045
                                                62/121
5,000,925 A * 3/1991 Krishnamurthy ....... C01B 32/50
                                               422/234

(Continued)

FOREIGN PATENT DOCUMENTS

CN        110711463 A * 1/2020
CN        113148952 A * 7/2021

(Continued)

*Primary Examiner* — Miguel A Diaz
*Assistant Examiner* — Ibrahim A. Michael Adeniji
(74) *Attorney, Agent, or Firm* — Morgan, Lewis & Bockius LLP (57) ABSTRACT

A liquid natural gas (LNG) reforming system of the present invention may include a reformer provided to receive LNG from an LNG tank; a CO2 PSA unit connected to the reformer and configured to extract carbon dioxide from off-gas generated from the reformer; a cooler connected to the CO2 PSA unit and configured to cool and liquefy the carbon dioxide extracted by the $CO_2$ PSA unit using the LNG supplied from the LNG tank to the reformer; a storage tank connected to the cooler and provided to store liquid carbon dioxide of the cooler therein; and a circulation pump provided to pump the liquid carbon dioxide from the cooler into the storage tank and circulate a part of the liquid carbon oxide into the cooler.

7 Claims, 4 Drawing Sheets

(56) References Cited

U.S. PATENT DOCUMENTS

| | | | | |
|---|---|---|---|---|
| 2008/0078177 A1* | 4/2008 | Faulkner | ............ | C10L 3/10 |
| | | | | 60/648 |
| 2010/0056648 A1* | 3/2010 | Schroer | ............ | C01B 3/384 |
| | | | | 518/703 |
| 2014/0174104 A1* | 6/2014 | Jeon | ............ | F17C 7/04 |
| | | | | 62/50.7 |
| 2015/0027682 A1* | 1/2015 | Guerra | ............ | F25J 1/0254 |
| | | | | 165/281 |

FOREIGN PATENT DOCUMENTS

| | | | | |
|---|---|---|---|---|
| JP | 2003028567 A * | 1/2003 | ............ | F25J 1/001 |
| KR | 10-2009-0084844 A | 8/2009 | | |
| KR | 102141970 B1 * | 6/2019 | ............ | C01B 3/34 |

* cited by examiner

LNG REFORMING SYSTEM AND METHOD OF CONTROLLING THE SAME

CROSS REFERENCE TO RELATED APPLICATION

The present application claims priority to Korean Patent Application No. 10-2021-0045183, filed Apr. 7, 2021, the entire contents of which is incorporated herein for all purposes by this reference.

BACKGROUND OF THE INVENTION

Field of the Invention

The present invention relates to a system for producing hydrogen by reforming liquid natural gas (LNG).

Description of Related Art

In a method of producing hydrogen by reforming LNG, there is a problem in that a large amount of carbon oxide ($CO_2$) is generated. Therefore, there is a demand for a technology that properly recovers the carbon dioxide generated in the reforming process such that as little carbon dioxide is released into the atmosphere as possible, and the recovery of carbon dioxide needs to be performed very efficiently.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an LNG reforming system and a method of controlling the same, which make it possible to effectively separate carbon dioxide generated in the LNG reforming process and to store the separated dioxide in a liquid state and makes it possible to efficiently and stably maintain the pressure in the space storing liquid carbon dioxide so that carbon dioxide may be easily stored for a long time and the space occupied by the entire system may be reduced.

According to various aspects of the present invention, an LNG reforming system includes: a reformer provided to receive LNG from an LNG tank; a CO2 PSA unit connected to the reformer and configured to extract carbon dioxide from off-gas generated from the reformer; a cooler connected to the CO2 PSA unit and configured to cool and liquefy the carbon dioxide extracted by the $CO_2$ PSA unit using the LNG supplied from the LNG tank to the reformer; a storage tank connected to the cooler and provided to store liquid carbon dioxide of the cooler therein; and a circulation pump provided to pump the liquid carbon dioxide from the cooler into the storage tank and circulate a part of the liquid carbon oxide into the cooler.

The cooler may be provided with a cooling coil through which the LNG supplied from the LNG tank to the reformer passes, and the cooler may be configured to spray the liquid carbon dioxide circulated by the circulation pump onto the cooling coil.

A gaseous phase supply pipe may be provided between the storage tank and the cooler so that gaseous carbon dioxide in an upper portion of the storage tank is cooled and liquefied in the cooler.

The gaseous phase supply pipe may be provided with a gaseous phase pipe valve configured to open or close the gaseous phase supply pipe.

A liquid phase supply pipe may be provided between the storage tank and the cooler so that the liquid carbon dioxide from the storage tank may be sprayed to the cooling coil through which the LNG in the cooler passes, and a supply pump configured to pump the liquid carbon dioxide to the cooler through the liquid phase supply pipe may be provided.

The liquid phase supply pipe may be provided with a liquid phase pipe valve configured to open or close the liquid phase supply pipe.

A level control valve mounted between the circulation pump and the storage tank and configured to control an amount of the liquid carbon dioxide pumped by the circulation pump and transferred to the storage tank may be provided to maintain the level of the liquid carbon dioxide in the cooler within a predetermined reference range.

The LNG reforming system may further include a heat exchanger provided to allow heat exchange to be performed between the carbon dioxide supplied from the $CO_2$ PSA unit to the cooler and the LNG supplied from the cooler to the reformer.

In another aspect of the present invention, a method of controlling an LNG reforming system of the present invention includes: measuring a level of liquid carbon dioxide in a cooler when LNG starts to be supplied to a reformer connected to the cooler; stopping a circulation pump and driving a supply pump to supply liquid carbon dioxide in the storage tank to the cooler when the level of the liquid carbon dioxide in the cooler is less than a predetermined minimum reference level; and stopping the supply pump and driving the circulation pump to circulate the liquid carbon dioxide to the cooler when the controller determines that the level of the liquid carbon dioxide in the cooler is equal to or greater than the predetermined minimum reference level and lower than a predetermined maximum reference level.

The method may further include opening the level control valve so that the liquid carbon dioxide in the cooler is transferred to the storage tank by the circulation pump when the level of the liquid carbon dioxide in the cooler exceeds the maximum reference level.

The method may further include closing the level control valve when the level of the liquid carbon dioxide in the cooler falls within a predetermined closing range determined between the predetermined minimum reference level and the predetermined maximum reference level.

With the present invention it is possible to effectively separate carbon dioxide generated in the LNG reforming process and to store the separated dioxide in a liquid state, and it is possible to efficiently and stably maintain the pressure in the space storing liquid carbon dioxide so that carbon dioxide may be easily stored for a long time and the space occupied by the entire system may be reduced.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

A specific structural or functional description of embodiments of the present invention disclosed in the specification or application is provided merely for the purpose of describing the exemplary embodiment according to various exemplary embodiments of the present invention. Therefore, the exemplary embodiments according to various exemplary embodiments of the present invention may be implemented in various forms, and the present invention should not be construed as being limited to the exemplary embodiments described in the specification or application.

Various changes and modifications may be made to the exemplary embodiments according to various exemplary embodiments of the present invention, and therefore various exemplary embodiments will be illustrated in the drawings and described in the specification or application. However, it should be understood that embodiments according to the concept of the present invention are not limited to the disclosed exemplary embodiments of the present invention, but the present invention includes all modifications, equivalents, and alternatives falling within the spirit and scope of the present invention.

Such terms as "a first" and/or "a second" may be used to described various elements, but the elements should not be limited by these terms. These terms are intended merely to distinguish one element from other elements. For example, a first element may be named a second element and similarly a second element may be named a second element without departing from the scope of protection of the present invention.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to any other component, it should be understood that there is no component therebetween. The other expressions of describing a relation between structural elements, i.e. "between" and "merely between" or "neighboring" and "directly neighboring", should be interpreted similarly to the above description.

The terms used in various exemplary embodiments of the present invention are merely used to describe specific embodiments, and are not intended to limit the present invention. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person skilled in the art to which various exemplary embodiments of the present invention pertains. Such terms as those defined in a generally used dictionary may be interpreted to have the meanings equal to the contextual meanings in the relevant field of art, and are not to be interpreted to have ideal or excessively formal meanings unless clearly defined in various exemplary embodiments of the present invention.

Hereinafter, various exemplary embodiments of the present invention will be described in detail with reference to the accompanying drawings. The same or like reference signs presented in the drawings designate the same or like elements.

Figure 1:
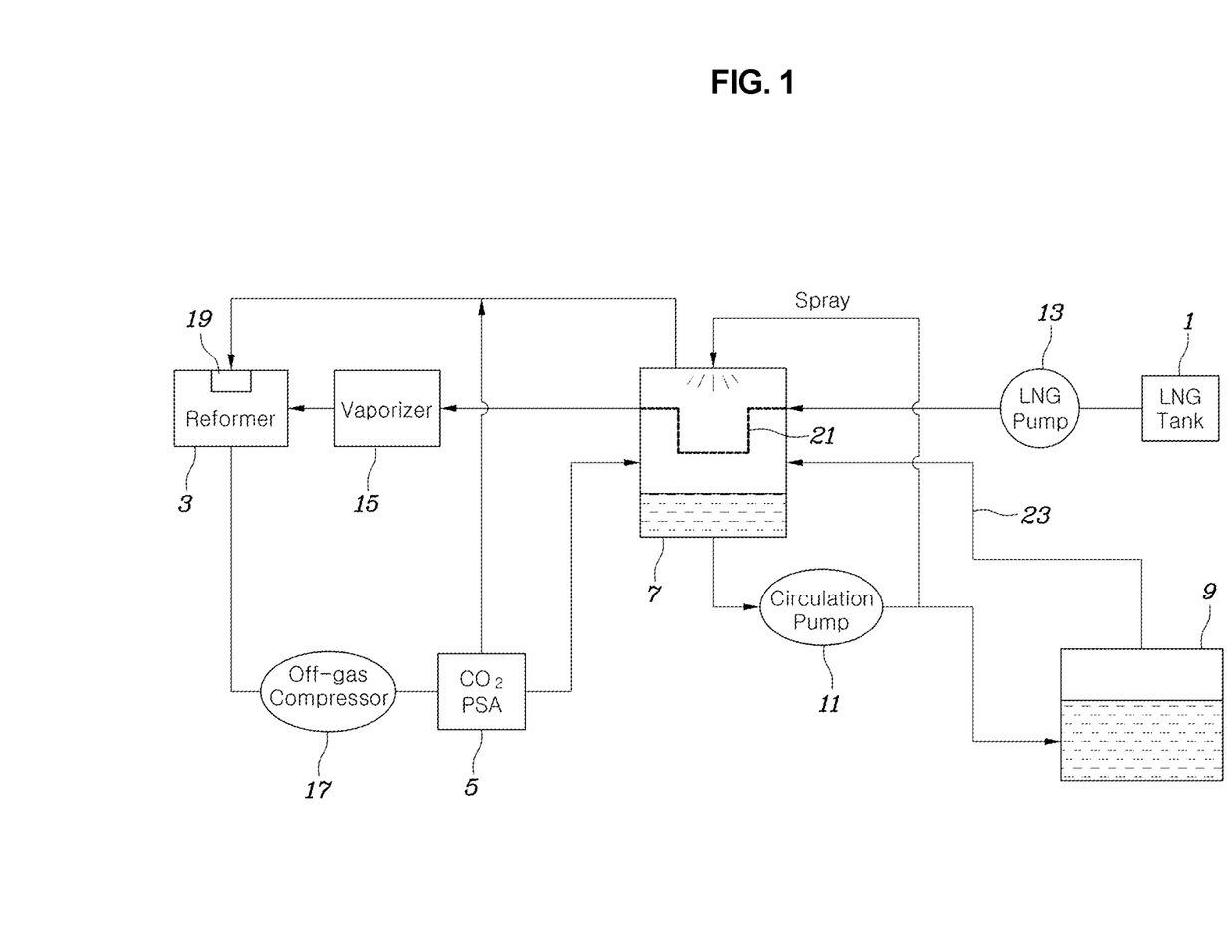
FIG. 1 is a block diagram illustrating an exemplary embodiment of an LNG reforming system according to various exemplary embodiments of the present invention.
Figure 2:
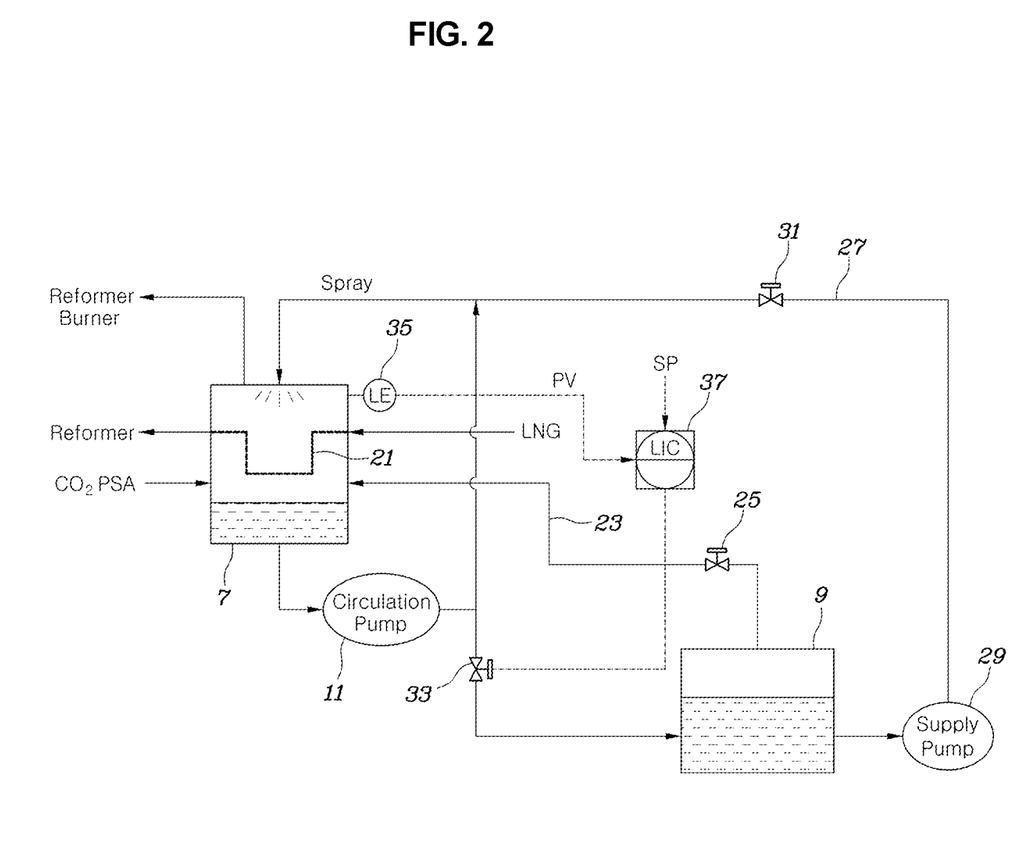
FIG. 2 is a detailed view exemplarily illustrating the main portion of FIG. 1 in more detail.

Referring to FIG. 1 and FIG. 2, an LNG reforming system according to various exemplary embodiments of the present invention includes: a reformer 3 provided to receive LNG from an LNG tank 1; a $CO_2$ pressure swing adsorption (PSA) unit 5 configured to extract carbon dioxide from off-gas generated from the reformer 3; a cooler 7 configured to cool and liquefy the carbon dioxide extracted by the $CO_2$ PSA unit 5 using the LNG supplied from the LNG tank 1 to the reformer 3; a storage tank 9 provided to store liquid carbon dioxide of the cooler 7; and a circulation pump 11 provided to pump the liquid carbon dioxide from the cooler 7 into the storage tank 9 and circulate the liquid carbon oxide into the cooler 7.

Furthermore, an LNG pump 13 is provided to pump the LNG from the LNG tank 1 toward the reformer 3, a vaporizer 15 is provided to vaporize the LNG that has passed through the cooler 7 and supply it to the reformer 3, and an off-gas compressor 17 is provided to compress the off-gas generated from the reformer 3 and to supply the off-gas to the $CO_2$ PSA unit 5.

For reference, the off-gas other than carbon dioxide extracted from the $CO_2$ PSA unit 5 is supplied to a burner 19 of the reformer 3 to be burned.

The cooler 7 is provided with a cooling coil 21 through which the LNG supplied from the LNG tank 1 to the reformer 3 passes, and is configured to spray the liquid carbon dioxide circulated by the circulation pump 11 onto the cooling coil 21.

That is, liquid carbon dioxide is stored under the cooler 7 and the cooling coil 21 is located above the cooler 7 so that, when the liquid carbon dioxide is sprayed toward the cooling coil 21 as described above, the sprayed liquid carbon dioxide is cooled and dropped through contact with the cooling coil 21, effectively reducing the temperature in the cooler 7 and thus efficiently cooling and condensing the gaseous carbon dioxide supplied from the $CO_2$ PSA unit 5 or the storage tank 9, converting the gaseous carbon dioxide into a liquid phase.

To the present end, a gaseous phase supply pipe 23 is provided between the storage tank 9 and the cooler 7 so that gaseous carbon dioxide above the storage tank 9 may be cooled and liquefied in the cooler 7.

The gaseous phase supply pipe 23 may be provided with a gaseous phase pipe valve 25 configured for opening and closing the pipe. The gaseous phase pipe valve 25 may be configured to be opened or closed through separate control, but may be configured as a simple check valve so that the gaseous carbon dioxide from the storage tank 9 is configured for flowing only in a direction toward the cooler 7.

The flow of the gaseous carbon dioxide in the gaseous phase supply pipe 23 is basically made by a pressure difference between the pressure in the cooler 7 and the pressure in the storage tank 9.

That is, when condensation of the gaseous carbon dioxide by cooling occurs in the cooler 7, the pressure is lowered so that gaseous carbon dioxide naturally generated in the storage tank 9 is automatically introduced into the cooler 7 due to the pressure difference. Therefore, the storage tank 9 is configured for storing carbon dioxide for a long time period without having a separate gaseous carbon dioxide liquefaction facility to maintain the internal pressure, and such an action is configured for being spontaneously performed without driving a separate pump or the like.

Meanwhile, to ensure that the liquid carbon dioxide in the storage tank 9 may be sprayed to the cooling coil 21 through which the LNG in the cooler 7 passes, a liquid phase supply pipe 27 may be provided between the storage tank 9 and the cooler 7, and a supply pump 29 is provided to pump liquid carbon dioxide to the cooler 7 through the liquid phase supply pipe 27.

That is, in the state in which the level of the liquid carbon dioxide in the cooler 7 is too low, the supply pump 29 is driven to supply the liquid carbon dioxide from the storage tank 9 to the cooler 7 and spray the liquid carbon oxide to the cooling coil 21.

Of course, the supply pump 29 may be provided on the liquid phase supply pipe 27 or may be provided in the storage tank 9.

The liquid phase supply pipe 27 may be provided with a liquid phase pipe valve 31 configured for opening and closing the pipe, and the liquid phase pipe valve 31 may be configured to be opened or closed through separate control, but may be configured as a simple check valve so that the liquid carbon dioxide from the storage tank 9 is configured for flowing only in the direction toward the cooler 7 and the liquid carbon dioxide pumped by the circulation pump 11 is not configured for flowing back to the storage tank 9.

As described above, the cooler 7 is configured for effectively cooling and condensing the gaseous carbon dioxide extracted from the $CO_2$ PSA unit 5 and the gaseous carbon dioxide generated from the storage tank 9 using LNG supplied to the reformer 3, and the continuous cooling function of the cooler 7 is configured for being maintained using the liquid carbon dioxide and the liquid carbon dioxide is configured for being stored in the storage tank 9 for a long time period, whereby it is possible to contribute to reducing the space required for facilities of the LNG reforming system.

Meanwhile, to maintain the level of the liquid carbon dioxide in the cooler 7 within a predetermined reference range, a level control valve 33 is provided to control the amount of liquid carbon dioxide pumped by the circulation pump 11 and transferred to the storage tank 9.

In FIG. 2, the level control valve 33 is configured to be controlled by a level controller 37 which is configured to receive a current level value PV, which is a signal of the level sensor 35 that measures the level of the liquid carbon dioxide in the cooler 7, and to control the level control valve 33 while comparing the current level value PV with a set value SP. The level controller 37 may be configured as a simple on-off controller rather than a proportional derivation (PD) controller or a proportional integral derivation (PID) controller.

Here, to exclude a situation in which the level of the liquid carbon dioxide in the cooler 7 is too low to circulate the liquid carbon dioxide by the circulation pump 11 and thus to smoothly perform cooling, and to exclude a situation in which the level of the liquid carbon dioxide in the cooler 7 is too high so that the cooling coil 21 is immersed in liquid carbon dioxide, which makes it difficult to smoothly cool and condense gaseous carbon dioxide, the reference range may be determined by design through a number of tests and analysis, and may be set as a range between a minimum reference level and a maximum reference level to be described later.

Figure 3:
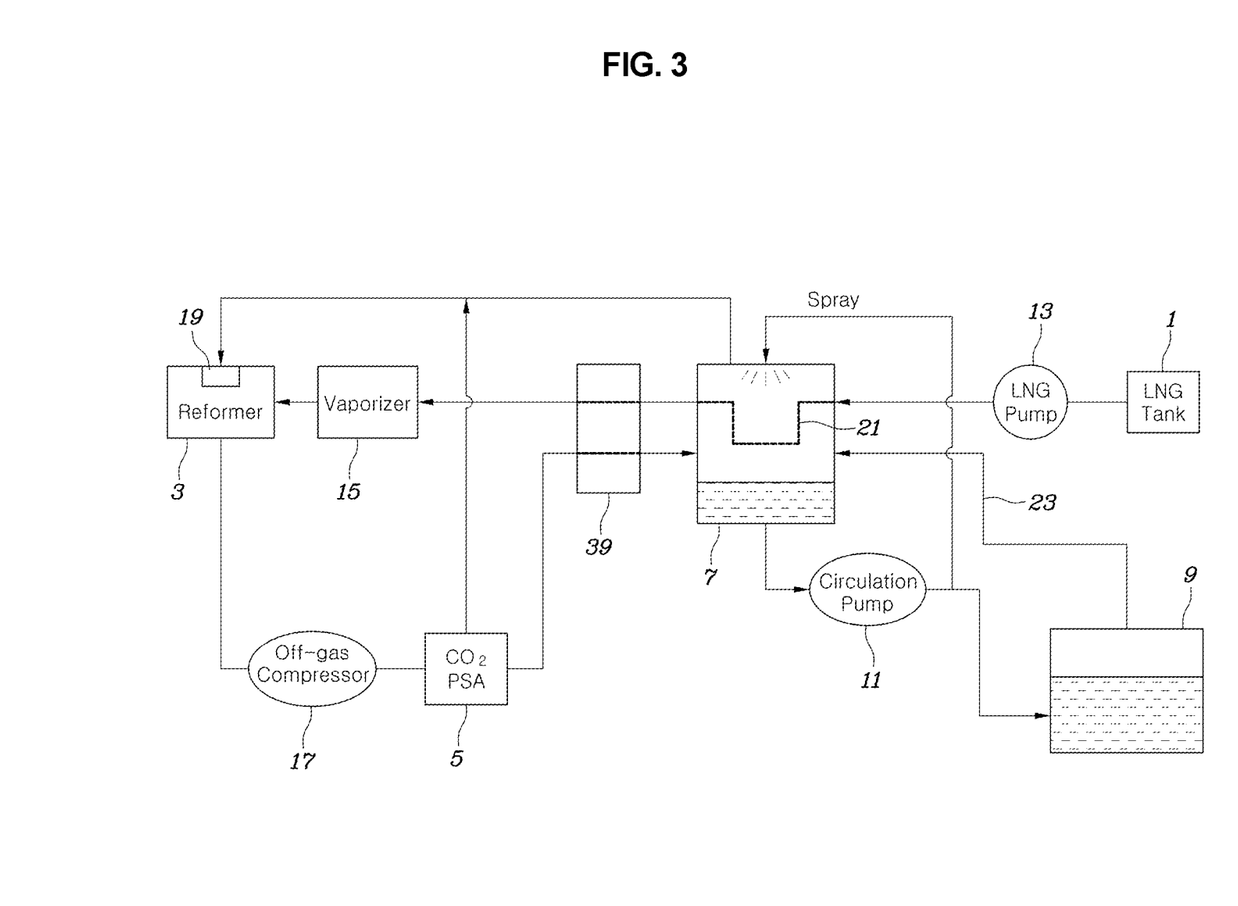
FIG. 3 is a block diagram illustrating another exemplary embodiment of the LNG reforming system according to various exemplary embodiments of the present invention.

FIG. 3 illustrates another exemplary embodiment of the LNG reforming system according the present invention. The configuration of the present exemplary embodiment of the present invention is the same as that of the exemplary embodiment of FIG. 1, except that the former further includes a heat exchanger 39 provided to allow heat exchange to be performed between the carbon dioxide supplied from the $CO_2$ PSA unit 5 to the cooler 7 and the LNG supplied from the cooler 7 to the reformer 3.

When the heat exchanger 39 is further provided as described above, the carbon dioxide supplied from the $CO_2$ PSA unit 5 to the cooler 7 is first cooled by the LNG directed from the cooler 7 to the reformer 3, and then is to be supplied to the cooler 7. Thus, it is possible to reduce the capacity of the cooler 7 and to reduce the amount of heat used to drive a carburetor 15 configured to vaporize the LNG, which makes it possible to operate a more energy efficient LNG reforming system.

Figure 4:
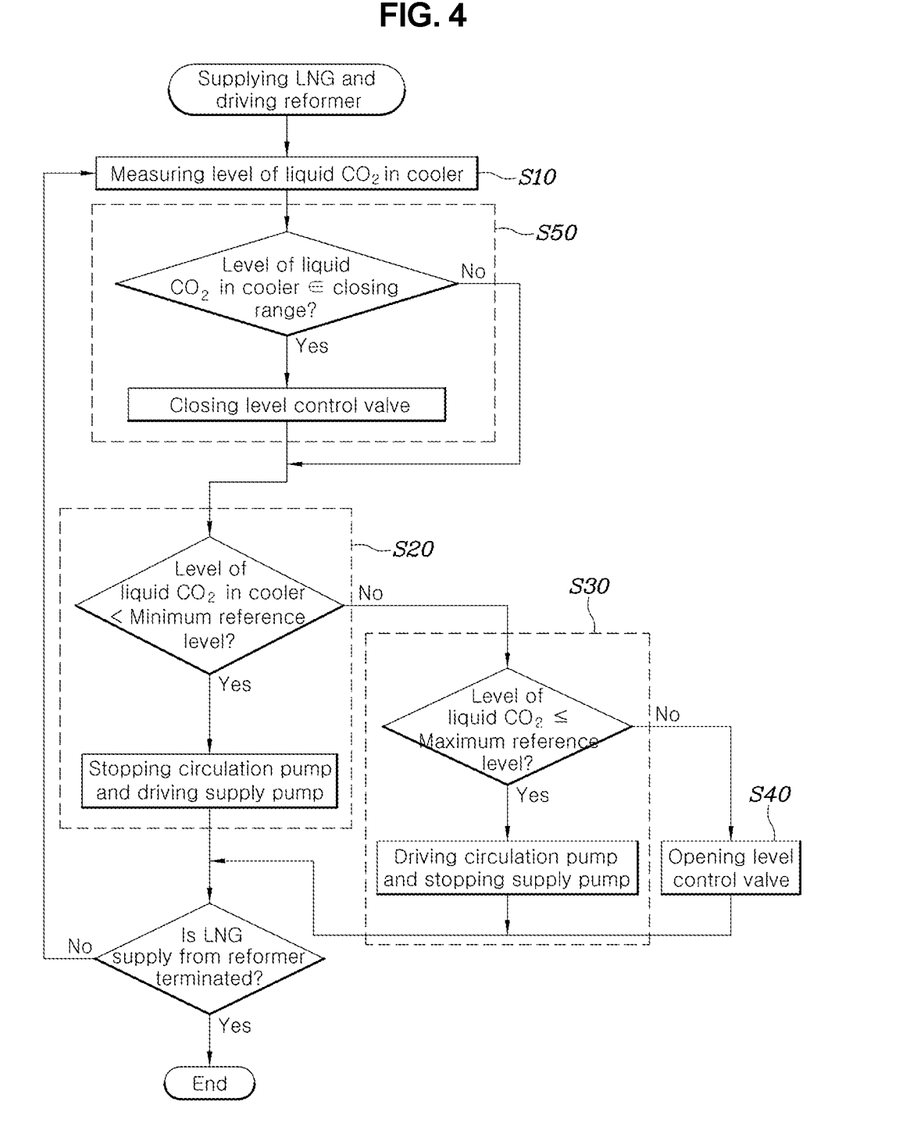
FIG. 4 is a flowchart illustrating an exemplary embodiment of a method of controlling an LNG reforming system of the present invention.

Referring to FIG. 4, a method of controlling an LNG reforming system according to various exemplary embodiments of the present invention may include: measuring a level of liquid carbon dioxide in a cooler 7 when LNG starts to be supplied to a reformer 3 (S10); stopping a circulation pump 11 and driving a supply pump 29 to supply liquid carbon dioxide in the storage tank 9 to the cooler 7 when the level of the liquid carbon dioxide in the cooler 7 is less than a predetermined minimum reference level (S20); and stopping the supply pump 29 and driving the circulation pump 11 to circulate the liquid carbon dioxide to the cooler 7 when the level of the liquid carbon dioxide in the cooler 7 is equal to or greater than the predetermined minimum reference level and lower than a predetermined maximum reference level (S30).

That is, it is determined whether to drive only the circulation pump 11 or the supply pump 29 according to the level of liquid carbon dioxide in the cooler 7.

The predetermined minimum reference level may be set through a number of tests and analysis in consideration of the minimum level of liquid carbon dioxide at which the state in which the liquid carbon dioxide in the cooler 7 is sprayed to the cooling coil from the upper side of the cooler 7 is maintained smoothly and stably through the driving of the circulation pump 11, and the cooling action achieved thereby. For example, the predetermined minimum reference level may be set to, for example, 20% of the maximum level in which the cooling coil 21 is not immersed in the liquid carbon dioxide.

Accordingly, when the cooler 7 is in the state in which the level of the liquid carbon dioxide is equal to or greater than the predetermined minimum reference level and lower than the maximum reference level, only the circulation pump 11 is driven to continuously maintain the state in which the liquid carbon dioxide in the cooler 7 is pumped to the upper side of the cooler 7 and sprayed.

In various exemplary embodiments of the present invention, when the level of the liquid carbon dioxide in the cooler 7 exceeds the maximum reference level, it is possible to allow the liquid carbon dioxide in the cooler 7 to be transferred to the storage tank 9 by the circulation pump 11 by opening the level control valve 33 (S40).

The maximum reference level may be determined by design through a number of tests and analysis such that the cooling coil 21 of the cooler 7 may be prevented from being immersed in liquid carbon dioxide and an appropriate level of space for receiving and cooling gaseous carbon dioxide flowing into the cooler 7 may be secured. For example, the maximum reference level may be set to 70% to 90% of the maximum level or the like.

Meanwhile, the method may further include closing the level control valve 33 when the level of the liquid carbon dioxide in the cooler 7 falls within a predetermined closing range determined between the predetermined minimum reference level and the maximum reference level (S50).

That is, when the level of the liquid carbon dioxide in the cooler 7 exceeds the maximum reference level and the level control valve 33 is opened so that the level of the liquid carbon dioxide in the cooler 7 falls within the above-mentioned closing range after the opening, the level control valve 33 is closed to stop the liquid carbon dioxide from moving from the cooler 7 to the storage tank 9 so that the level of the liquid carbon dioxide in the cooler 7 is at an appropriate level.

Therefore, it may be desirable to set the closing range to a range close to the predetermined minimum reference level in a range equal to or greater than the predetermined minimum reference level to ensure that while preventing frequent opening and closing of the level control valve 33, the level of the liquid carbon dioxide in the cooler 7 may be stably maintained by driving only the circulation pump 11, and the closing range may also be determined by design through a number of tests and analysis.

Of course, the closing range may be applied when the control of the level control valve 33 is implemented by a simple on-off controller.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by multiple control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A liquid natural gas (LNG) reforming system comprising:
   a reformer provided to receive LNG from an LNG tank;

a CO₂ pressure swing adsorption (PSA) unit connected to the reformer and configured to extract carbon dioxide from off-gas generated from the reformer;

a cooler connected to the CO$_2$ PSA unit and configured to cool and liquefy the carbon dioxide extracted by the CO$_2$ PSA unit using the LNG supplied from the LNG tank to the reformer;

a storage tank connected to the cooler and provided to store liquid carbon dioxide of the cooler therein;

a circulation pump provided to pump the liquid carbon dioxide from the cooler into the storage tank and to circulate a part of the liquid carbon oxide into the cooler;

a heat exchanger provided to allow heat exchange to be performed between the carbon dioxide supplied from the CO$_2$ PSA unit to the cooler and the LNG supplied from the cooler to the reformer; and a gaseous phase supply pipe which is connected between the storage tank and the cooler so that gaseous carbon dioxide in an upper portion of the storage tank is cooled and liquefied in the cooler, wherein a vaporizer is provided between the reformer and the heat exchanger so that the LNG is supplied from the cooler to the reformer via the heat exchanger and the vaporizer.

2. The LNG reforming system of claim 1, wherein the cooler is provided with a cooling coil through which the LNG supplied from the LNG tank to the reformer passes, and wherein the cooler is configured to spray the part of the liquid carbon dioxide circulated by the circulation pump onto the cooling coil.

3. The LNG reforming system of claim 1, wherein the gaseous phase supply pipe is provided with a gaseous phase pipe valve configured to open or close the gaseous phase supply pipe.

4. The LNG reforming system of claim 1, further including:

a liquid phase supply pipe which is connected between the storage tank and the cooler so that the liquid carbon dioxide from the storage tank is sprayed to a cooling coil through which the LNG in the cooler passes.

5. The LNG reforming system of claim 4, further including:

a supply pump mounted to the liquid phase supply pipe and configured to pump the liquid carbon dioxide to the cooler through the liquid phase supply pipe.

6. The LNG reforming system of claim 4, wherein the liquid phase supply pipe is provided with a liquid phase pipe valve configured to open or close the pipe liquid phase supply pipe.

7. The LNG reforming system of claim 1, further including:

a level control valve mounted between the circulation pump and the storage tank and configured to control an amount of the liquid carbon dioxide pumped by the circulation pump and transferred to the storage tank to maintain a level of the liquid carbon dioxide in the cooler within a predetermined reference range.

* * * * *